Figure 1:
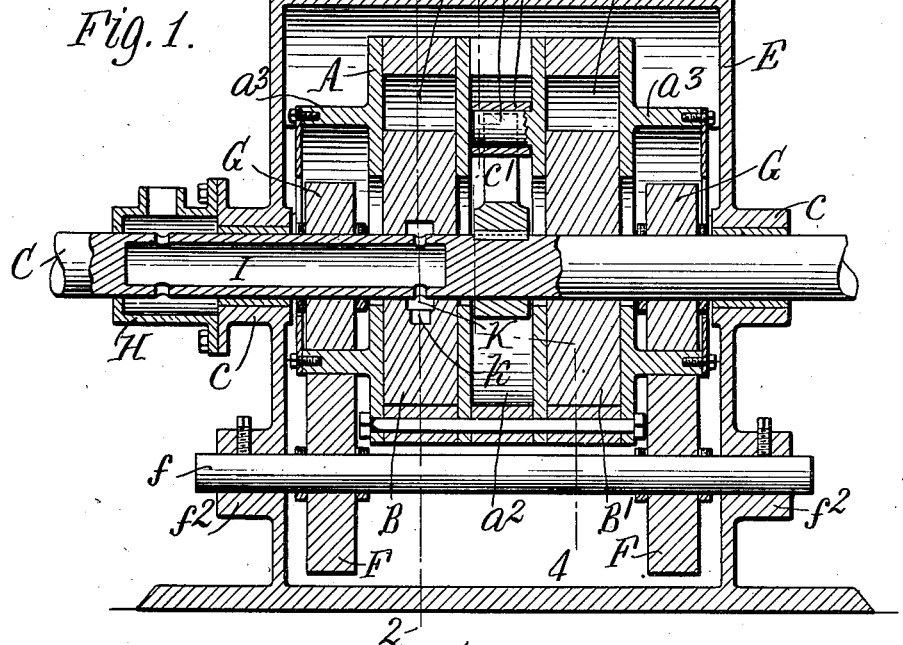

B. F. HOFFMAN.
ROTARY ENGINE.
APPLICATION FILED JULY 15, 1908.

917,944.

Patented Apr. 13, 1909.
2 SHEETS—SHEET 1.

Witnesses:
E. A. Volk
A. G. Dimond

Inventor.
Bertram F. Hoffman,
by Wilhelm, Parker & Hard,
Attorneys

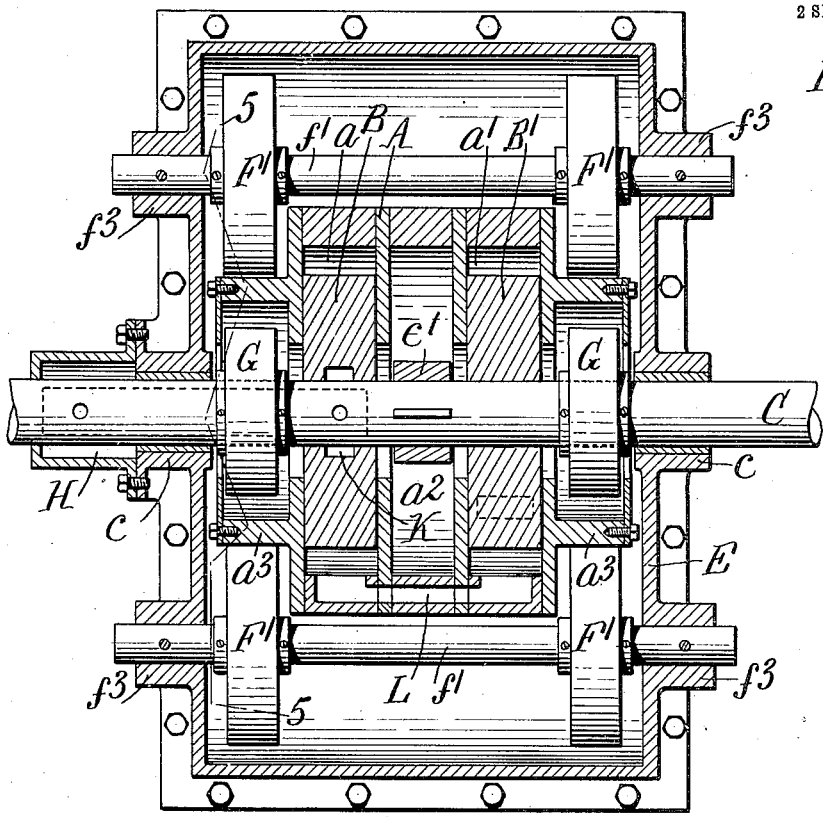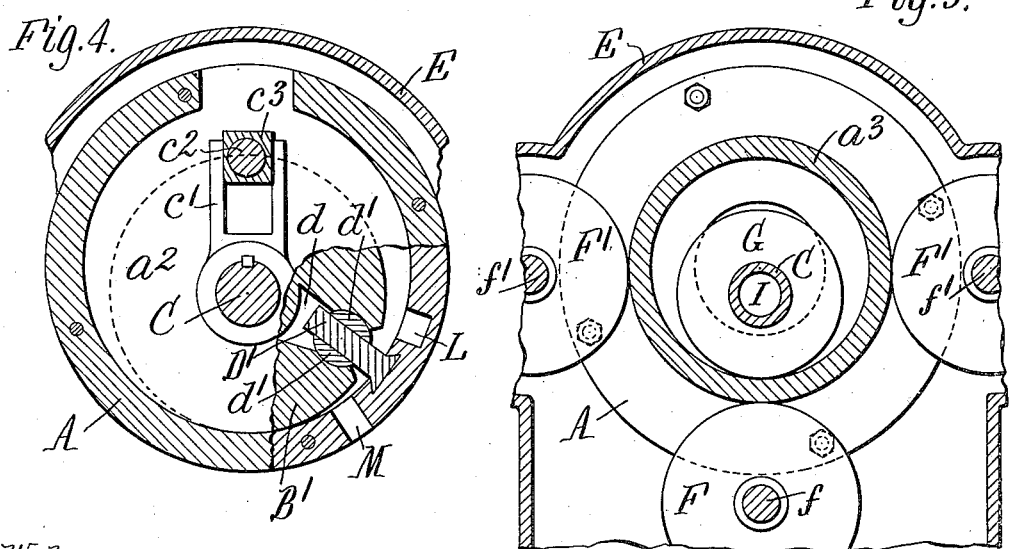

UNITED STATES PATENT OFFICE.

BERTRAM F. HOFFMAN, OF BUFFALO, NEW YORK, ASSIGNOR, BY MESNE ASSIGNMENTS, TO BALANCE PRESSURE ROTARY ENGINE COMPANY, OF BUFFALO, NEW YORK, A CORPORATION OF NEW YORK.

ROTARY ENGINE.

No. 917,944.  Specification of Letters Patent.  Patented April 13, 1909.

Application filed July 15, 1908. Serial No. 443,640.

*To all whom it may concern:*

Be it known that I, BERTRAM F. HOFFMAN, a citizen of the United States, residing at Buffalo, in the county of Erie and State of New York, have invented a new and useful Improvement in Rotary Engines, of which the following is a specification.

This invention relates more particularly to improvements in rotary steam engines of that type which comprises essentially a rotary cylinder, a core or part which is arranged eccentrically within the cylinder in contact therewith at one side and rotates in the same direction as the cylinder, and a piston or blade which is secured to the cylinder and bridges the space between the same and the core and against which the steam acts in turning the cylinder which is connected to the drive shaft and constitutes the driving element of the engine. The steam pressure in the piston chamber tends to separate or force the core and cylinder apart, which causes them to turn on their bearings in the same direction, the core rolling around within the cylinder.

The primary object of this invention is to provide rolling bearings for the cylinder and the core whereby the core is maintained in rolling contact with the cylinder, and anti-friction bearings are at the same time provided which receive the opposing pressures on the core and cylinder and prevent excessive friction and wear thereon.

Another object of the invention is to improve rotary engines of this type in the respects hereinafter described and set forth in the claims.

In this application a multiple cylinder engine is described and illustrated having two piston chambers with a core and piston in each chamber, and means for admitting and using the steam first in one piston chamber, then admitting the expanding steam from this chamber into the second chamber while the exposed area of the piston in the first chamber is decreasing and the exposed area of the piston in the second chamber is increasing, and finally exhausting the steam from the second chamber, so as thereby to secure in an engine of small size the effect of a long travel of a piston of maximum and substantially constant area for each admission of the steam and obtain the maximum efficiency of the steam used. Most features of the invention are not, however, restricted to multiple cylinder engines of this sort, but are equally applicable to single cylinder engines or multi-stage engines of other types.

Figure 2:
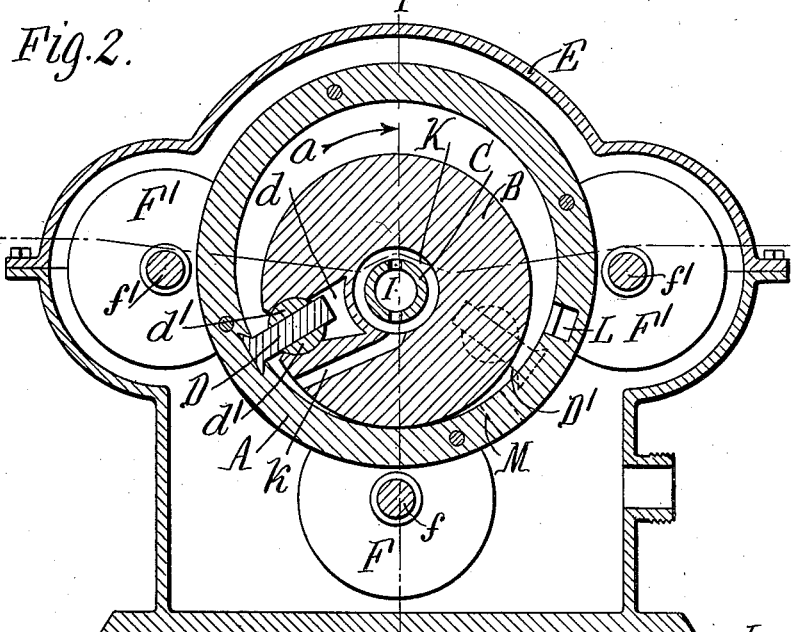

In the accompanying drawings, consisting of two sheets: Figure 1 is a longitudinal sectional elevation, in line 1—1, Fig. 2, of a multiple cylinder rotary engine embodying the invention. Fig. 2 is a transverse sectional elevation thereof through the primary piston chamber, in line 2—2, Fig. 1. Fig. 3 is a sectional plan thereof in line 3—3, Fig. 2. Fig. 4 is a fragmentary transverse sectional elevation thereof, substantially in line 4—4, Fig. 1. Fig. 5 is a fragmentary transverse sectional elevation in line 5—5, Fig. 3, showing the roller bearings for the cylinder and cores.

Like letters of reference refer to like parts in the several figures.

A represents the rotary cylinder; B B' two rotary cores arranged eccentrically in two piston chambers $a$ $a'$ in the cylinder in contact at one side with the cylindrical walls thereof; C the rotary drive shaft; D D' the pistons or blades on which the steam exerts its pressure in turning the cylinder, and E a stationary casing which incloses the cylinder and constitutes the supporting frame for the same and the cores.

In the engine shown in the drawings, the cylinder is provided between the two piston chambers $a$ $a'$ with a middle chamber or space $a^2$ and has cylindrical hubs or bearing flanges $a^3$ at its opposite ends which rest upon roller bearings hereinafter described. The cylinder can be of any suitable construction. The drive shaft C extends through the cylinder eccentrically thereto and is journaled at opposite ends in suitable bearings $c$ on the ends of the inclosing casing. The drive shaft passes centrally through and supports the cores B B' which are loose and adapted to turn thereon, and is connected to the cylinder independently of the cores so as to be positively driven by the cylinder, preferably by a slotted arm $c'$, Figs. 1 and 4, which is fixed to the shaft in the middle cylinder chamber or space $a^2$ and a pin $c^2$ secured to the cylinder in the middle cylinder chamber $a^2$ and passing through a radial slot in the arm $c'$. A cross-head $c^3$ through which the pin $c^2$ passes, slides radially in the slot of the arm $c'$. This connection causes the shaft to turn positively with the cylinder but the sliding engagement between the arm and the pin allows for the necessary movement of the connecting pin toward and from the shaft due to the eccentric arrangement of the shaft in the cylinder. The pistons or blades D D' are suitably secured rigidly to the cylinder and extend inwardly therefrom across the steam spaces between the cylinder and cores into pockets $d$ in the cores. Segmental bearing blocks $d'$, or other means, are provided between the pistons and the sides of the piston pockets $d$ to allow the pistons to slide radially and oscillate in the pockets in the operation of the engine and prevent the steam from passing the pistons. The pistons or blades cause the cores to turn with the cylinder in the operation of the engine, but the cores are loose on the drive shaft C and the shaft is positively driven by the cylinder independently of the cores by the connecting arm $c'$ and pin $c^2$, and consequently the friction and wear between the pistons or blades and the cores are greatly reduced. Furthermore, as the drive shaft, upon which the cores bear, is turned in the same direction as the cores, there is only a relatively short slipping or oscillating movement of the cores on the shaft due to their eccentricity in the cylinder, so that the friction and wear between these parts are also very slight.

F represents bearing rollers upon which the hubs or bearing flanges $a^3$ at the ends of the cylinder rest and turn, and F' represents bearing rollers arranged at opposite sides of the hubs or flanges of the cylinder and contacting therewith to prevent lateral motion of the cylinder on the bearing rollers F. The axes of the side rollers F' are preferably arranged on or slightly below the horizontal plane of the axis of the cylinder, so that while they prevent lateral motion of the cylinder they do not prevent the same from lifting. The lower and side bearing rollers F and F' are journaled in any suitable manner, for instance, as shown, they turn on shafts $f$ and $f'$ which engage at opposite ends in bearings $f^2$ and $f^3$ on the opposite ends of the inclosing casing.

G G represent two bearing rollers which turn loosely on the drive shaft C within the hubs or flanges $a^3$ of the cylinder and bear on the inner surfaces of said hubs or flanges at a point above the point of contact of said hubs or flanges with the lower bearing rollers F. The pressure of the steam in the piston chambers between the cores and cylinder tends to lift the cylinder and forcibly press the cores downwardly against the lower portion of the cylinder, but the shaft rollers G, bearing against the hubs or flanges $a^3$ of the cylinder, relieve the pressure of the cores on the cylinder and at the same time, as the cylinder is supported on the lower bearing rollers F, the pressure of the drive shaft in its bearings is relieved. The steam pressure between the cylinder and cores does not always act directly in a vertical line, but the side-bearing rollers F' prevent any lateral play of the cylinder due to lateral pressure of the steam, and the shaft rollers G are always held against the lower portion of the bearing flanges or hubs of the cylinder. This arrangement of the bearing rollers insures the necessary contact between the cores and cylinder but prevents excessive pressure of the cores against the cylinder so as to reduce the friction and wear on these contacting surfaces. The rollers provide rolling or anti-friction bearings for both the cores and cylinder.

As usual, in engines of this type, the steam is admitted to and exhausted from each piston chamber through suitable ports at opposite sides of the piston or blade in said chamber.

In the engine shown, the drive shaft passes through a steam box H connected with a steam supply pipe and the steam passes from this box through a passage I, Fig. 1, in the shaft and an annular chamber K and passage $k$, Fig. 2, in the core B into the piston chamber $a$ in rear of the piston or blade D. An intermediate passage L leads through the cylindrical wall of the cylinder from the first piston chamber $a$ to the second piston chamber $a'$ at a point in rear of the piston D', and an exhaust passage M leads from the second piston chamber through the wall of the cylinder at a point in front of the piston D'. In the operation of the engine the steam enters the first piston chamber in rear of the piston D through the passage $k$ in the core B and causes the cylinder and core to turn in the clockwise direction indicated by the arrow in Fig. 2. When the intermediate passage L passes the point of contact of the core D with the cylinder, the expanding steam will flow through this passage into the second piston chamber in rear of the second piston D' and act on this piston. The steam in the first piston chamber in front of the piston D flows through the intermediate passage L into the second piston chamber and the steam in this chamber in front of the piston D' escapes through the exhaust port M into the inclosing casing E, from which it passes off through a pipe not shown. The steam thus acts first on one piston and then on the second in the same direction, causing the engine to rotate in the direction indicated.

A suitable valve or valves is or are ordinarily provided to properly time the admission and cut-off of the steam to the engine, yielding packing or contact strips are provided between the cores and the inner surface of the cylinder, and suitable means are of course employed for packing such joints of the engine as may be necessary, but these and other incidental features of the engine form no part of this invention and are not shown or described.

The described roller bearings are applicable to either single cylinder engines or other types of multiple cylinder engines, and the particular connecting means between the cylinder and drive shaft is applicable to multi-stage engines of other kinds employing the cylinder and eccentric cores rotating in the same direction. These features are also applicable to pumps, and other mechanisms similar in organization to the engine described.

I claim as my invention:

1. In a rotary engine or the like, the combination of a rotary cylinder, a core which is arranged eccentrically in the cylinder and rotates therewith, a piston connecting the cylinder and core, bearings for the cylinder, supporting means for the core, and rollers connected to the core-supporting means concentrically with the axis of the core and bearing on portions of the cylinder concentric with the axis thereof, substantially as set forth.

2. In a rotary engine or the like, the combination of a rotary cylinder, a core which is arranged eccentrically in the cylinder in contact therewith at one side, a piston which is secured to one of said parts and has a movable connection with the other part whereby said core and cylinder turn in the same direction, bearings for the cylinder, supporting means for the core, and rollers connected to the core-supporting means concentrically with the axis of the core and bearing on portions of the cylinder concentric with the axis thereof, substantially as set forth.

3. In a rotary engine or the like, the combination of a rotary cylinder, a core which is arranged eccentrically in the cylinder in contact therewith at one side, a piston connecting the cylinder and core, roller bearings on which the cylinder rests, a shaft which supports the core, and rollers on said shaft which bear on portions of the cylinder concentric with its axis, substantially as set forth.

4. In a rotary engine or the like, the combination of a rotary cylinder, a core which is arranged eccentrically in the cylinder in contact therewith at one side, a piston connecting the cylinder and core, roller bearings for the cylinder, a shaft on which the core turns, roller bearings between the cylinder and core, and a drive connection between the cylinder and said shaft for turning the shaft, substantially as set forth.

5. In a rotary engine or the like, the combination of a rotary cylinder, a core which is arranged eccentrically in the cylinder in contact therewith at one side, a piston connecting the cylinder and core, said cylinder having concentric bearing flanges, bearing rollers on which said flanges rest, a shaft which supports the core, and rollers on said shaft which bear on the inner surfaces of said bearing flanges, substantially as set forth.

6. In a rotary engine or the like, the combination of a rotary cylinder, a core which is arranged eccentrically in the cylinder in contact therewith at one side, a piston connecting the cylinder and core, said cylinder having concentric bearing flanges, bearing rollers on which said flanges rest, a shaft on which the core turns, bearings in which said shaft is journaled, rollers which are loose on said shaft and bear on the inner surfaces of said bearing flanges, and a drive connection between the cylinder and said shaft for turning the shaft, substantially as set forth.

7. In a rotary engine or the like, the combination of a rotary cylinder, a core which is arranged eccentrically in the cylinder in contact therewith at one side, a piston connecting the cylinder and core, a shaft on which the core turns, and a drive connection between the cylinder and said shaft comprising an arm fixed to said shaft, and a device secured to said cylinder and having a sliding engagement with said arm, substantially as set forth.

Witness my hand, this 27th day of June, 1908.

BERTRAM F. HOFFMAN.

Witnesses:
C. B. HORNBECK,
C. W. PARKER.